United States Patent
Chen et al.

(10) Patent No.: US 7,018,044 B2
(45) Date of Patent: Mar. 28, 2006

(54) DISPLAY SYSTEM INCORPORATING SPECTRAL SEPARATION AND HOMOGENIZATION

(75) Inventors: Chien-Hua Chen, Corvallis, OR (US); Brett Dahlgren, Lebanon, OR (US); Michael A. Pate, Tuscon, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/608,972

(22) Filed: Jun. 26, 2003

(65) Prior Publication Data

US 2004/0263791 A1 Dec. 30, 2004

(51) Int. Cl.
*G03B 21/00* (2006.01)
*G03B 21/14* (2006.01)
*G03B 21/28* (2006.01)

(52) U.S. Cl. ............... 353/31; 353/33; 353/84; 353/99

(58) Field of Classification Search .......... 353/20, 353/33, 34, 84, 98, 99, 31, 81, 102; 348/743, 348/744, 771, 742, 759; 349/5, 6, 7, 8; 359/831, 359/833, 834, 837, 634, 638, 639, 640, 618, 359/625
See application file for complete search history.

(56) References Cited

U.S. PATENT DOCUMENTS

| | | | |
|---|---|---|---|
| 5,565,933 A | 10/1996 | Reinsch | 348/742 |
| 5,738,426 A | 4/1998 | Daijogo et al. | 353/31 |
| 5,897,190 A * | 4/1999 | Takahashi | 353/31 |
| 5,967,636 A * | 10/1999 | Stark et al. | 353/84 |
| 6,334,685 B1 * | 1/2002 | Slobodin | 353/31 |
| 6,345,895 B1 | 2/2002 | Maki et al. | 353/33 |
| 6,398,364 B1 | 6/2002 | Bryars | 353/31 |
| 6,402,324 B1 | 6/2002 | Kuroda et al. | 353/52 |
| 6,467,912 B1 | 10/2002 | Kato | 353/101 |
| 6,481,852 B1 | 11/2002 | Osaka | 353/31 |
| 6,486,462 B1 * | 11/2002 | Rumer | 250/216 |
| 6,511,184 B1 | 1/2003 | Yamagishi et al. | 353/31 |
| 6,588,906 B1 * | 7/2003 | Hwang | 353/31 |
| 6,714,353 B1 * | 3/2004 | Park et al. | 359/640 |
| 6,843,567 B1 * | 1/2005 | Lee et al. | 353/31 |
| 6,893,133 B1 * | 5/2005 | Tang | 353/81 |
| 2001/0043403 A1 * | 11/2001 | Engelhardt | 359/640 |

FOREIGN PATENT DOCUMENTS

EP 0 704 138 8/2001

OTHER PUBLICATIONS

"Merriam-Webster's Collegiate Dictionary, Tenth Edition," copyright 2001, p. 925.*
Stupp et al. "Projection Displays," copyright 1999, John Wiley & Sons Ltd., pp. 90 and 402.*
"Projection Displays", Stupp and Brennesholtz, John Wiley & Sons, Ltd., copyright 1999, pp. 89 through 98.*

* cited by examiner

*Primary Examiner*—Melissa Jan Koval

(57) ABSTRACT

A display system is provided that includes a spectral separator configured to separate multispectral light into a plurality of light bands, and a homogenizing element configured to homogenize at least one separated light band.

23 Claims, 4 Drawing Sheets

DISPLAY SYSTEM INCORPORATING SPECTRAL SEPARATION AND HOMOGENIZATION

BACKGROUND

Image projection systems may be used to display a still or video image, or to enable the image to be viewed simultaneously by a large or small audience. Such projection systems are intended to produce image color and brightness as faithfully as possible. However, the quality of the projected image often may be enhanced by, among other factors, a brighter light source. The brightness of the light source used may be particularly important when projecting an image in the presence of even moderate ambient light levels.

Projection engines typically modulate red, green, and blue light to produce a projected image, where the red, green, and blue light is derived from a white light source. For example, the white light produced by the light source may be focused and directed through a color wheel. A color wheel is typically a rapidly rotating color filter wheel interposed between the light source and an image-forming element, and typically includes segments having different light-filtering properties. A typical color wheel may include filter segments such as a red transmissive filter segment, a green transmissive filter segment, and a blue transmissive filter segment. As the color wheel is rapidly rotated, colored light may be sequentially projected onto the image-forming element.

While the use of such color wheels effectively yields the desired red, green, and blue light for image formation, it does so by blocking the transmission of undesired light wavelengths. In other words, to produce colored light, a significant portion of the light from the light source is blocked, resulting in a decreased light output of the light engine, compared to the output of the light source.

In addition, the use of a color filter wheel may require that the wheel be rotated at very high speeds (for example, up to 7,500 rpm), and with high precision. Such a mechanism typically is not only expensive, but is delicate, and may create unwanted noise during operation of the projector. cl SUMMARY A display device is provided that includes a spectral separator configured to separate multispectral light into a plurality of light bands, and a homogenizing element configured to homogenize at least one separated light band.

DETAILED DESCRIPTION

Figure 1:
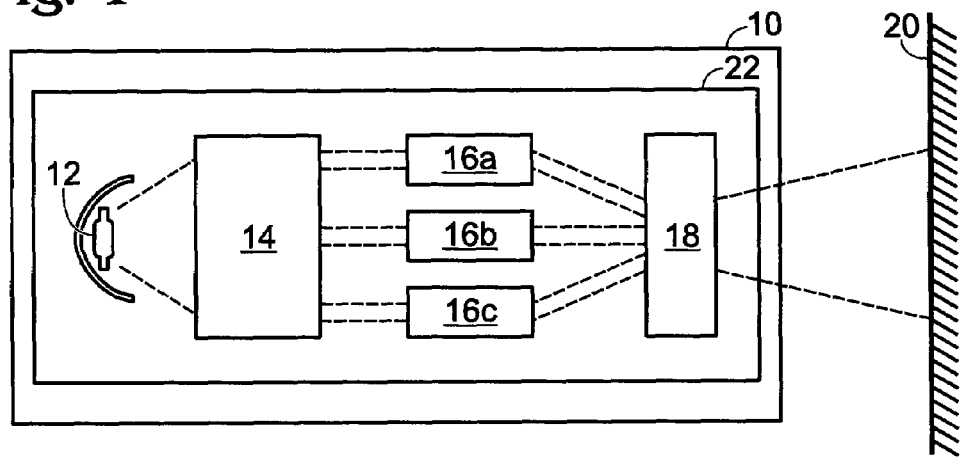
FIG. 1 is a schematic representation of a display device according to an embodiment of the invention.

Referring initially to FIG. 1, a display device according to an embodiment of the present invention is shown schematically at 10. Display device 10 may include a light source 12, a spectral separator 14, homogenizing elements 16a, 16b, 16c, and an image-forming element 18 configured to form an image. The resulting image may be projected onto a display surface 20.

Figure 2:
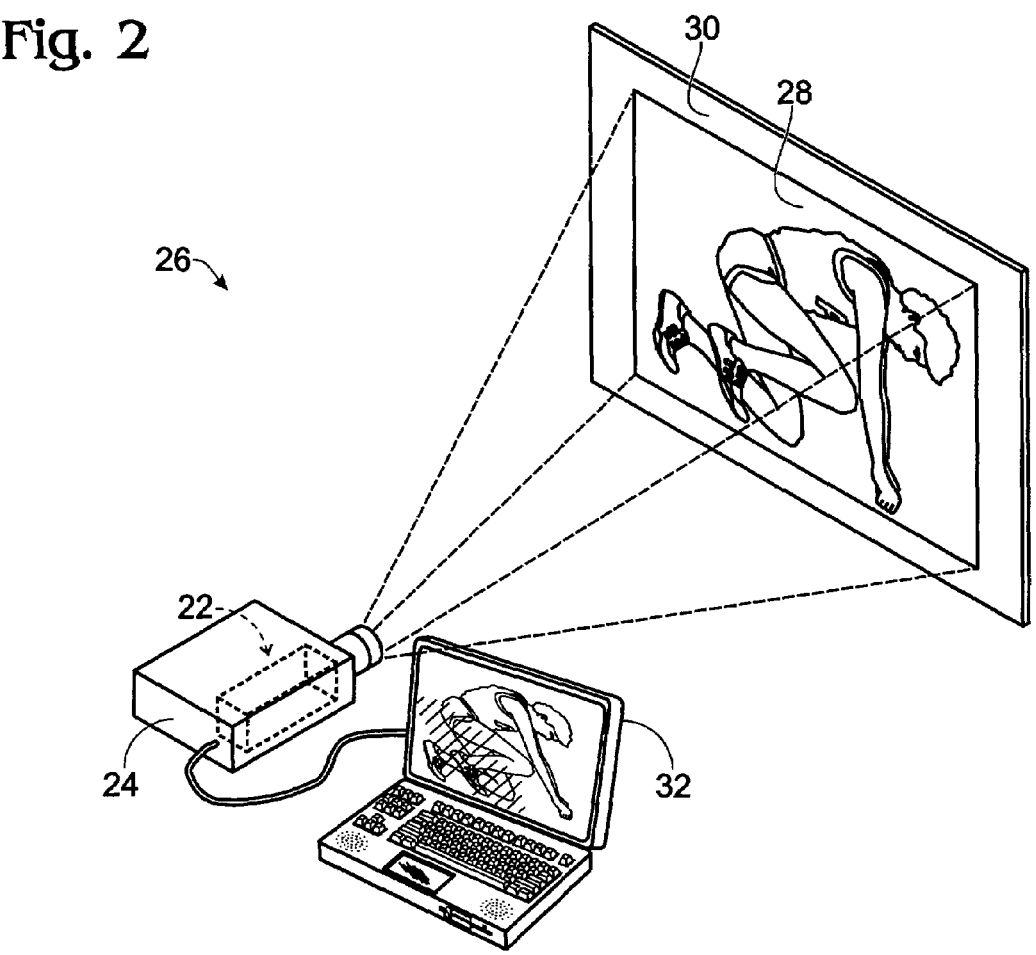
FIG. 2 is an isometric view of an imaging system including the display device of FIG. 1.

Light source 12, spectral separator 14, homogenizing elements 16a, 16b, 16c, and image-forming element 18 may be components of a light engine 22 of a projector 24, where the light engine is generally configured to direct and transmit light to the display surface to generate a projected image. For example, projector 24 is shown in FIG. 2 as a component of an imaging system 26. Projector 24 may be adapted to project an image 28 onto a display surface such as projection screen 30. The projector may be associated with a source of image data, such as an associated processor, depicted in FIG. 2 as a laptop computer 32.

Projector 24 is depicted as a front projection system, however many types of projection systems may be suitable for use with the display system of the invention, including both front and rear projection devices. In a front projection system as shown in FIG. 2, the viewer typically is located on the same side of the screen as the projector, and the projector is spaced and separate from the screen. In a rear projection system, the viewer typically is located on the opposite side of the screen as the projector, the projector is spaced and separate from the screen, and the projected image is viewed through an at least partially light transmissive screen (for example as shown in U.S. patent application Ser. No. 10/020,112, filed Dec. 14, 2001, hereby incorporated by reference). The images projected by the image projector may include still images or video images. Both still and video images will be referred to herein simply as projected images.

Light source 12 of display device 10 may be configured to generate multispectral light, that is, light having more than a single wavelength or narrow range of wavelengths. Light source 12 may be a broad spectrum light source, a full spectrum light source, or a white light source. Selected appropriate light sources may include, among others, metal halide lamps, xenon lamps, halogen lamps, mercury vapor lamps, plasma lamps, and incandescent lamps.

Spectral separator 14 may be configured to receive the multispectral light generated by light source 12, and separate it into multiple bands based on the wavelength of the light. That is, the broad spectrum light from the light source may be separated into multiple distinct beams of light that are physically separated in space, where each beam includes light that is part of a more narrow range of wavelengths than that produced by the multispectral light source.

Each separated beam of light may then be received by a homogenizing element 16a, 16b, 16c. As used herein, 'homogenization' of each separated light beam includes mixing of the light frequencies and light intensities across the width of the separated light beam. That is, for at least some portion of the homogenized light beam, different frequencies of light are spatially intermixed. While any degree of mixing, or homogenization, is advantageous, a significant degree of mixing typically is desirable. In fact, a homogenizing element may be capable of creating a substantially uniform frequency and intensity profile in a received light beam.

Image-forming element 18 may include any device or apparatus configured to receive the homogenized light beams from the homogenizing elements, and form an image by selectively manipulating the light beams. For example, the image-forming element may include a transmissive image-forming element, such as a liquid crystal display panel (LCD), among others. Alternatively, the image-forming element may function as a reflective image-forming element, such as digital micromirror device (DMD), a grating light valve (GLV), or liquid crystal on silicon (LCOS), among others.

It should be appreciated that display device 10 may include additional optics, spatial light modulators, scanning mirrors, focusing devices, color-generation devices, controllers, etc.

Figure 3:
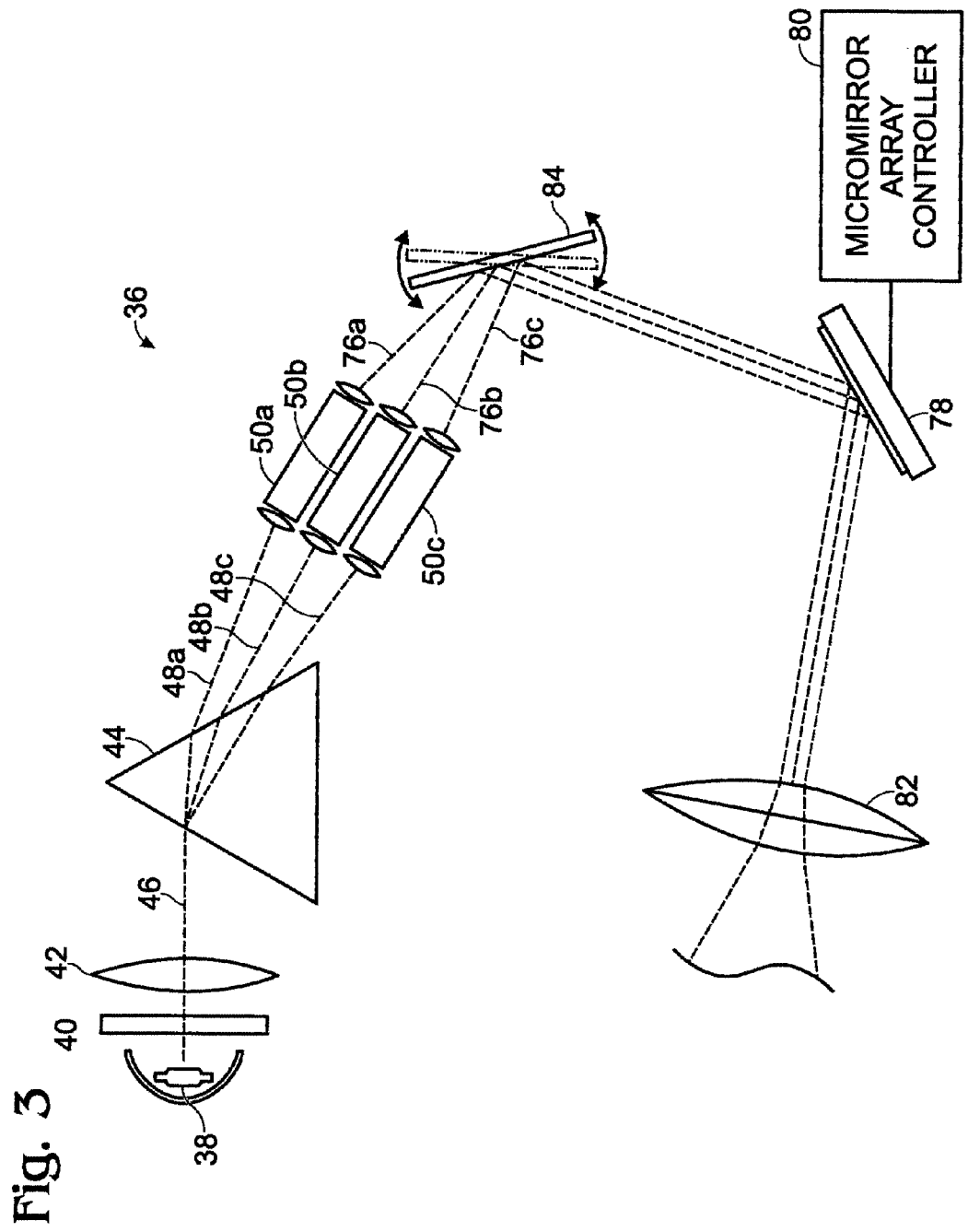
FIG. 3 is a semi-schematic representation of a display device according to an alternative embodiment of the invention.

A particular example of a light engine for a display device is shown schematically at 36 in FIG. 3. Light engine 36 includes white light source 38. The white light produced by white light source 38 may be directed through an infrared filter 40 in order to block nonvisible and potentially damaging thermal radiation that may be generated by the light source. The resulting IR-filtered white light may be directed through a primary condenser lens 42 and focused for transmission into a spectral separator that is a prism 44. Prism 44 may be configured to refract the incident white light into a plurality of spectrally distinct bands. For example, in FIG. 3, incident white light 46 is separated into light beams 48*a*, 48*b*, 48*c* that may generally correspond to the red, green, and blue regions of visible light, respectively.

As a function of the refraction caused by prism 44, light beams 48*a*, 48*b*, 48*c* may include a range of frequencies from lower to higher frequency light. That is, when taken in combination, beams 48*a*, 48*b*, 48*c* may form a continuous gradual spectrum of light that includes substantially all the visible light wavelengths generated by light source 38. Rather than filtering away a portion of the generated light, nearly the complete output of the visible light source may be preserved, resulting in image projection with high efficiency. However, it will be appreciated that spectral differentiation across bands 48*a*, 48*b*, 48*c* may compromise the quality and/or fidelity of the projected image if the light included in each band is not first homogenized by a homogenizing element.

The homogenizing elements may include light pipes 50*a*, 50*b*, 50*c*. As shown in greater detail in FIG. 4, light pipe 50*a* may include a light conduit 52 having a highly light-reflective inner surface 54. Where the spectrally-differentiated light entering the conduit at conduit entry 56 has been refracted by a prism or other spectral separator, the various wavelengths of light strike the reflective inner surface 54 of the conduit at differing incident angles, and are therefore reflected at differing angles. As a result, the incident light is scattered and reflected along the conduit multiple times, until the multiply-reflected light leaves the conduit at exit 58. The exiting light may be substantially mixed with respect to intensity and wavelength, and is typically at least somewhat homogeneous, and may be substantially homogeneous.

Figure 4:
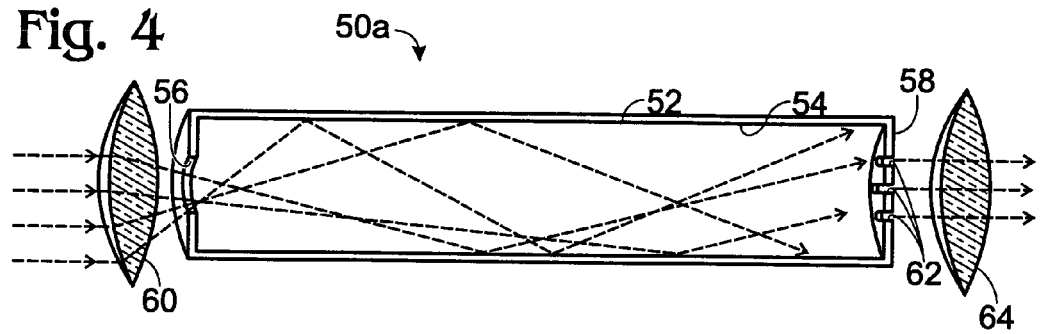
FIG. 4 is a semi-schematic representation of the homogenizing element of the light engine of FIG. 3.

Conduit 52 of light pipe 50*a* may include fiber optic cable. The reflective surface 54 may be applied to the exterior of the fiber optic cable to yield an internal mirror. Light pipe 50*a* may further include entrance optics 60 adjacent entrance 56 to focus or direct the incoming light beam. Exit 58 of light pipe 50*a* may include one or more apertures 62 configured to shape the emerging beam, and/or exit optics 64 to focus or direct the emerging homogenized light beam. Although light pipe 50*a* is depicted in FIG. 4 as cylindrical in shape, a variety of other light pipe configurations may be used, including light pipes having square or oval cross-sections, among others.

Figure 5:
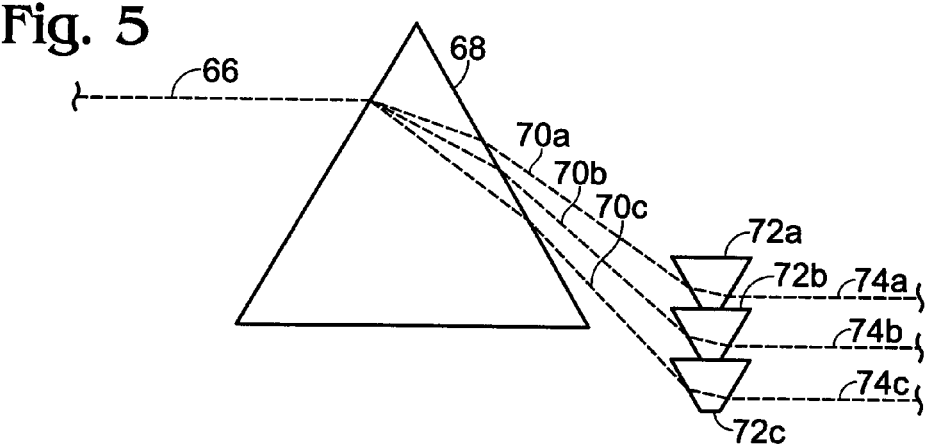
FIG. 5 is a semi-schematic representation of an alternative homogenizing element for the light engine of FIG. 3.

As an alternative to homogenization using a light pipe, spectrally-separated light may be homogenized using one or more inverse prisms. As shown in FIG. 5, incident white light beam 66 is refracted by prism 68 into non-uniform beams 70*a*, 70*b*, 70*c*. These spectrally-separated beams may then be homogenized by passing each beam through an inverse prism 72*a*, 72*b*, 72*c*, that may be selected to complement the refraction of prisms 70*a*, 70*b*, 70*c*, respectively. That is, inverse prisms 72*a*, 72*b*, 72*c* may be selected and oriented such that the frequencies and intensities of homogenized light beams 74*a*, 74*b*, 74*c* are at least somewhat mixed across the width of the beam by the inverse prisms. A separate inverse prism may be used to produce each discrete light beam desired for imaging from the refracted light beams 70*a*, 70*b*, 70*c*. As discussed above, the light exiting each inverse prism may be shaped into a beam having a cross-section that is selected to facilitate projection and/or scanning operations, for example, by a mask incorporating one or more slots, lenses or other optical components.

Referring again to FIG. 3, homogenized beams 76*a*, 76*b*, 76*c* may be directed and focused onto an image-forming element that is used to form the projected image with the homogenized light. Such image-forming element may take the form of a micromirror array 78, that selectively reflects light projected thereon according to input received from a micromirror array controller 80, typically in response to image data received by the display device.

The image formed by micromirror array 78 may be directed through projection optics 82, that in turn, direct the image onto the projection screen. The red, green, and blue light may be directed sequentially onto the micromirror array, provided that the sequential visible images produced by the micromirror array are alternated swiftly enough that a viewer's visual system may integrate the sequential images to perceive a full-color image. Particular imaging efficiency may be obtained by sequentially scanning light beams 76*a*, 76*b*, 76*c* across the micromirror array, so that substantially all of the light generated by light source 38 may be used to form the projected image.

Sequential scanning, as used herein, refers to a plurality of distinct light beams incident upon distinct non-overlapping portions of the micromirror array simultaneously, such that the light beams may be scanned across the micromirror array with a given micromirror element exposed to only one light beam at a time, and with each element exposed to each light beam in turn in a set sequence. Micromirror array controller 80 may coordinate the activation of micromirror elements in cooperation with the particular light beam incident on each element at a given time.

The light beams may be scanned across the micromirror array by any suitable scanning device, including but not limited to rotating polygon mirrors, flat mirrors, curved mirrors, lenses, and prisms. As shown in FIG. 3, the homogenized beams 76*a*, 76*b*, 76*c* may be scanned across the micromirror array by a galvanometric mirror 84. A galvanometric mirror, or galvo mirror, may be capable of precise movements in response to small electrical signals, and may therefore be well-suited to scanning light beams across the image-forming element.

Scanning a plurality of light beams onto the micromirror array may be simplified by shaping the light beams to project onto the array more efficiently. For example, the homogenized light beam may be directed through one or more apertures to give the beam an elongated cross-section. As shown in FIG. 4, light pipe exit 62 may incorporate a plurality of slots, each configured to shape the light exiting the light pipe into an elongate ribbon. An elongate ribbon of light may be scanned across micromirror array 78 so as to illuminate one or more parallel and adjacent columns or rows of mirror elements in a controlled fashion, to facilitate image formation by the micromirror array controller. Where the elongate ribbons have a length sufficient to span the entirety of one dimension of the micromirror array, the ribbons may be scanned in the other dimension.

Alternatively, where the light beams have a length that is insufficient to span the entirety of one dimension of the micromirror array, the light beams may be scanned in both dimensions of the micromirror array. For example, the light beams may be scanned rapidly across a first dimension of the micromirror array, and simultaneously scanned more slowly across a second dimension of the micromirror array. Slow scanning may be accomplished, for example, by the galvo mirror, while the rapid scanning may be accomplished, for example, using a rotating polygonal mirror.

As an alternative to employing a separate scanning element, such as a galvo mirror, scanning of light beams across the image-forming element may be accomplished by incorporating a scanning function into one or more of the other components of the light engine. For example, by rotating or otherwise modifying the orientation of primary prism 44, refracted light beams 48a, 48b, 48c may be scanned. The resulting refracted and scanned light may then be homogenized substantially as described above. The scanning action of prism 44 may be compensated for or enhanced by one or more additional components of the light engine. For example, the homogenizing element may be configured to rotate in correspondence with the scanning prism. Alternatively, the refracted light may be scanned onto an array of homogenizing elements, so that the refracted light may be homogenized by various homogenizing elements, in sequence, as the prism pivots.

Figure 6:
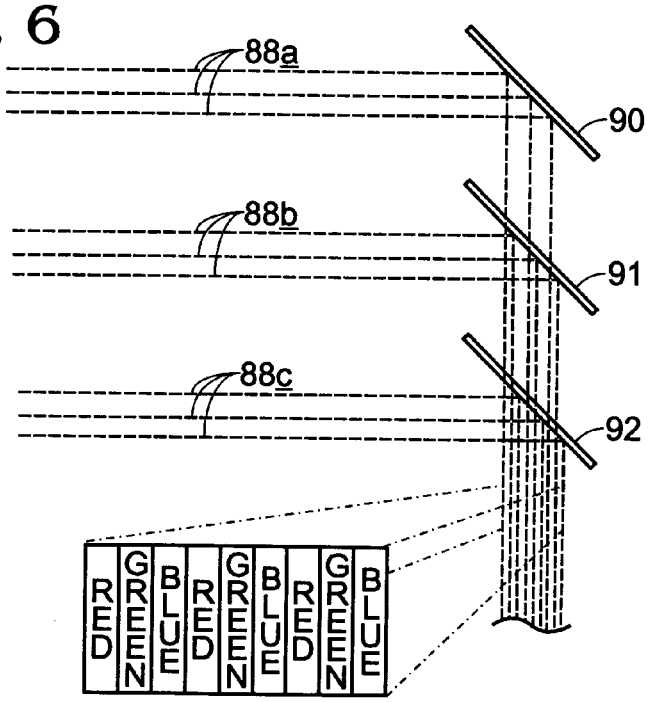
FIG. 6 is a schematic view showing interlacing of several homogenized light beams.

The scanning of the homogenized light beams may be simplified by interlacing the light beams, or orienting them alternatively and sequentially in space, at least somewhat adjacent to each other. As shown in FIG. 6, light beams 88a, 88b, 88c may be interlaced using dichroic mirrors 90, 91, and 92. Any alternative method for interlacing the homogenized light beams may be used to place the homogenized light beams into a conformation that is advantageous for application to the image-forming element. A variety of other light beam shapes may be similarly directed adjacent to each other for projection onto a selected image-forming element.

The interlaced ribbons of light may be configured as shown in FIG. 6, where at least one red ribbon, at least one green ribbon, and at least one blue ribbon are arranged sequentially. The elongate ribbons may have a width sufficient that each ribbon can address at least one column of micromirror array 78. The sequence of light ribbons may be repeated in sequence. As the repetition of the light sequence increases, the number of mirror elements that may be addressed by the interlaced light during a single scan also increases, thereby improving image quality and reducing demand on the performance of the scanning element. The width of the individual light beams may have a lower limit that is determined by the resolution of the image-forming element. Although the scanning procedure may be enhanced where the interlaced light pattern includes a repeated light ribbon sequence (such as red, green, blue, red, green, blue, etc.), it will be appreciated that even a single ribbon sequence may be effectively scanned across the image-forming element by the scanning element.

The operation of the micromirror array may be synchronized with the scanning element, the spectral separator, and/or the light source in order to produce the desired images. The micromirror array controller may coordinate operation of the array with respect to both time and space in order to coordinate with sequential colors of light scanned across the micromirror array. An algorithm used to coordinate the individual subunits of the micromirror array in both time and space may be similar to those used for time delay and integration (or TDI) techniques used in conjunction with charge-coupled device cameras. When using TDI, the light incident on a photosensitive detector from a moving object may be integrated over both time and space to enhance the detected signal from that object. In an analogous fashion, the reflection state of the individual pixels of the array may be coordinated with the scanning light beam in order to form the desired image.

Figure 7:
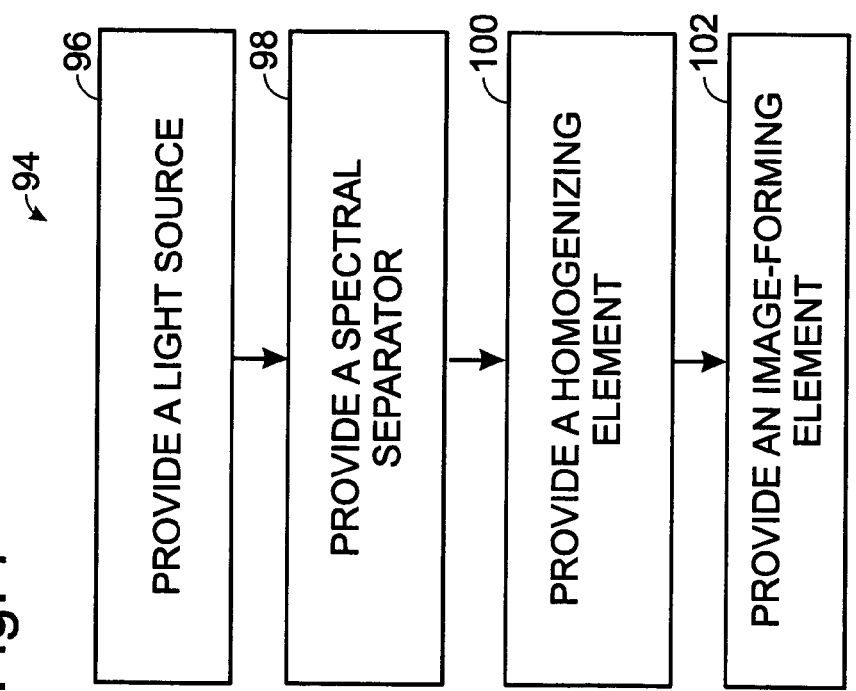
FIG. 7 is a flowchart depicting a method of making a display device, according to an embodiment of the invention.

Display devices incorporating some or all of the elements described herein may also include additional optics, light modulators, mirrors, focusing devices, and the like to assist in forming and projecting the desired image onto the display surface. A suitable display device may be manufactured using the method set out in flowchart 94 of FIG. 7. The illustrated method includes providing a light source at 96, providing a spectral separator configured to separate the light from the light source into a plurality of light bands at 98, providing a homogenizing element configured to homogenize at least one separated light band at 100, and providing an image-forming element configured to form an image from the homogenized light at 102.

Figure 8:
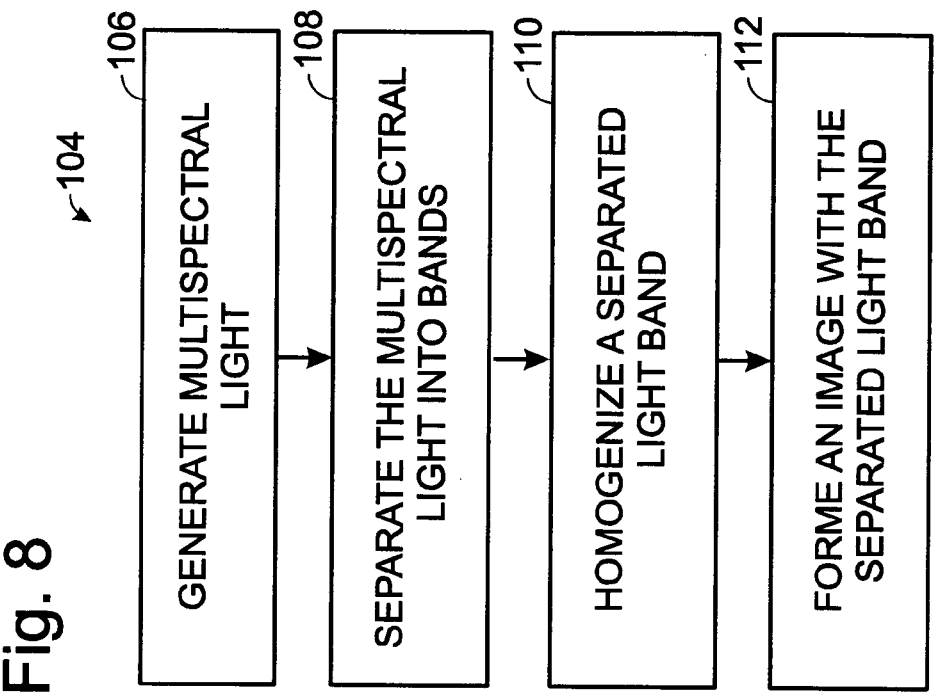
FIG. 8 is a flowchart depicting a method of forming a projected image, according to an embodiment of the invention.

It should be appreciated that the display device described herein is well-suited for use in a method of forming a projected image, as set out in flowchart 104 of FIG. 8. The illustrated method includes generating multispectral light at 106, separating the multispectral light into a plurality of light bands at 108, homogenizing at least one separated light band at 110, and forming an image using at least one homogenized light band at 112.

Appropriate software or firmware instructions to effect the methodology described above may be employed via a computer-readable medium. A computer-readable medium, as used herein, can be anything that can contain, store, communicate, propagate, or transport instructions for use by, or in connection with, an imaging system or imaging apparatus. The computer-readable medium can be, without limitation, an electronic, magnetic, optical, electromagnetic, infrared, or semiconductor system, apparatus, device, or propagation medium. More specific examples of a computer-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), and a portable compact disc read-only memory (CDROM) (optical). The instructions on the computer-readable media may represent an upgrade to projector software previously available, in order to permit the execution of the above-described method, or to execute an upgraded version of such software.

The display device disclosed herein is capable of spectral separation of visible light without requiring a rapidly spinning color wheel. Elimination of a color wheel permits display systems to be manufactured that exhibit a higher light output, faster operation, and quieter operation than color wheel-based projection systems, all desirable features for the end consumer.

While various alternative embodiments and arrangements of a display device, display system, and method for forming a projected image have been shown and described above, it will be appreciated by those of skill in the art that numerous other embodiments, arrangements, and modifications are possible and are within the scope of the present disclosure. Those skilled in the art thus will understand that many variations may be made therein without departing from the spirit and scope as defined in the following claims. The present description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding two or more such elements.

What is claimed is:

1. A display device, comprising:
a static spectral separator configured to refractively separate multispectral light into a plurality of light bands;
a homogenizing element configured to homogenize at least one separated light band; and
a plurality of dichroic mirrors configured to interlace the separated light bands.

2. The display device of claim 1, further comprising a light source configured to produce the multispectral light.

3. The display device of claim 1, further comprising an image-forming element configured to form an image using the interlaced light bands.

4. The display device of claim 3, where the interlaced light bands are configured to have a cross-section that facilitates scanning onto the image-forming element.

5. The display device of claim 4, where the cross-section includes an elongate ribbon.

6. The display device of claim 1, where the static spectral separator includes a prism.

7. The display device of claim 1, where the static spectral separator is configured to separate the multispectral light into at least three light bands.

8. The display device of claim 7, where the at least three light bands include red, green, and blue light bands.

9. The display device of claim 1, comprising at least one homogenizing element for each separated light band.

10. The display device of claim 9, where each homogenizing element includes a light pipe.

11. The display device of claim 3, where the image-forming element includes a micromirror array.

12. A method of making a display device, comprising:
providing a light source;
providing a static spectral separator configured to refractively separate the light from the light source into a plurality of light bands;
providing a homogenizing element configured to homogenize at least one separated light band;
providing a plurality of dichroic mirrors configured to interlace the separated light bands; and
providing an image-forming element configured to form an image from the homogenized light.

13. The method of claim 12, where providing the light source includes providing a multispectral light source;
providing the static spectral separator includes providing a prism;
providing the homogenizing element includes providing a light pipe; and
providing the image-forming element includes providing a micromirror array.

14. The method of claim 12, further comprising providing a scanning device configured to scan the interlaced light bands across the image-forming element.

15. A method of forming a projected image, comprising:
generating multispectral light;
refractively separating the multispectral light into a plurality of light bands by passing the multispectral light through a static spectral separator;
homogenizing at least one separated light band; and
interlacing the separated light bands using a plurality of dichroic mirrors; and
forming an image using the interlaced light bands.

16. The method of claim 15, where generating multispectral light includes generating substantially white light.

17. The method of claim 15, where separating the multispectral light into a plurality of light bands includes passing the multispectral light through a prism.

18. The method of claim 15, where homogenizing at least one separated light band includes passing the light band through a light pipe.

19. The method of claim 15, where forming an image includes selectively reflecting the light band from a reflective image-forming element.

20. The method of claim 19, where the image-forming element includes a micromirror array.

21. The method of claim 15, where forming an image includes scanning the interlaced light bands across an image-forming element.

22. The method of claim 21, where the interlaced light bands have the shape of an elongate ribbon.

23. The method of claim 15, including homogenizing each of a plurality of separated light bands.

* * * * *